United States Patent [19]

Gregory et al.

[11] Patent Number: 5,076,406
[45] Date of Patent: Dec. 31, 1991

[54] RADIALLY INTERLOCKING CLUTCH BRAKE

[75] Inventors: John R. Gregory, Fort Wayne; Richard A. Flotow, Butler, both of Ind.

[73] Assignee: Dana Corporation, Toledo, Ohio

[21] Appl. No.: 632,787

[22] Filed: Dec. 19, 1990

[51] Int. Cl.⁵ .................................................. F16D 67/02
[52] U.S. Cl. ............................. 192/13 R; 192/12 R; 192/107 R; 192/DIG. 1; 188/218 XL
[58] Field of Search ................. 192/12 R, 13 R, 14, 192/18 R, 107 R, 70.13, DIG. 1; 188/218 XL, 73.32

[56] References Cited

U.S. PATENT DOCUMENTS

| | | | |
|---|---|---|---|
| 184,540 | 11/1876 | Mills | 403/344 |
| 381,151 | 4/1888 | Mahoney | 403/362 |
| 403,858 | 5/1889 | Reeves et al. | 474/96 |
| 413,819 | 10/1889 | Annable | 403/344 |
| 416,457 | 12/1889 | Gilbert | 403/344 |
| 445,047 | 1/1891 | Cowles | 474/95 |
| 483,228 | 9/1892 | Little | 474/95 |
| 519,331 | 5/1894 | Hodge | 474/95 |
| 527,965 | 10/1894 | Gilbert | 403/344 |
| 536,696 | 4/1895 | Hirsh | 403/344 |
| 540,558 | 6/1895 | Peregrine | 403/344 |
| 542,166 | 7/1895 | Lorah | 403/344 |
| 553,525 | 1/1896 | Hankin | 403/344 |
| 554,431 | 2/1896 | White | 403/344 |
| 555,512 | 3/1896 | Johnson | 403/362 |
| 713,227 | 11/1902 | Levalley | 403/344 |
| 714,605 | 11/1902 | Potter | 403/344 |
| 727,707 | 5/1903 | Stauffer et al. | 403/344 |
| 736,304 | 8/1903 | Scott et al. | 403/344 |
| 744,917 | 11/1903 | Houldsworth | 403/344 |
| 752,907 | 2/1904 | Kelley | 403/344 |
| 774,965 | 11/1904 | Davenport | 494/95 |
| 776,224 | 11/1904 | Dickey | 403/344 |
| 799,963 | 9/1905 | Baldwin | 403/344 |
| 859,093 | 7/1907 | Masters | 403/344 |
| 918,078 | 4/1909 | McCaffrey | 403/344 |
| 1,453,673 | 5/1923 | Hebert | 474/95 |
| 1,550,279 | 8/1925 | Petrasek | 192/12 R |
| 1,991,569 | 2/1935 | Nickles | 192/70.13 |
| 2,138,329 | 11/1938 | Straubel | 242/68 |
| 2,143,005 | 1/1939 | Green | 248/157 |
| 2,191,444 | 2/1940 | Fleming | 287/52.03 |
| 2,849,105 | 8/1958 | Touton | 198/666 |
| 3,104,757 | 9/1963 | Dougherty et al. | 198/213 |
| 3,606,407 | 9/1971 | Pendergast | 287/52.01 |
| 4,043,437 | 8/1977 | Taylor | 192/13 R |
| 4,408,924 | 10/1983 | Huebner | 403/23 |
| 4,413,713 | 11/1983 | West | 192/14 X |
| 4,428,697 | 1/1984 | Ruland | 403/344 |
| 4,512,450 | 4/1985 | Babcock | 192/12 R |
| 4,687,084 | 8/1987 | Leigh-Monsterens | 192/85 CA |

Primary Examiner—Leslie A. Braun
Assistant Examiner—Andrea Pitts
Attorney, Agent, or Firm—F. B. McDonald

[57] ABSTRACT

An interlocking clutch brake provides first and second parts adapted to radially fit together to form a disc-shaped body having a central aperture for engaging a clutch shaft. Both first and second parts are U-shaped, and are interlocked together by means of mating tongue and groove members. The first and second parts employ bores which are adapted to become axially aligned for receiving the ends of a bowed spring. The bowed portion of the spring is adapted to become partially flattened as a bolt, secured through an aperture in the spring to a threaded aperture in the second part, is rotated by a hand-tool. Partial flattening of the bowed portion causes the spring ends to spread apart to engage respective sets of aligned bores for retaining the two parts together.

10 Claims, 1 Drawing Sheet

RADIALLY INTERLOCKING CLUTCH BRAKE

BACKGROUND OF THE INVENTION

This invention relates to clutch brakes of the type employed in heavy duty highway vehicles. More particularly, the invention relates to readily replaceable clutch brakes and to mechanisms designed to facilitate their removal and installation.

The prior art offers a number of interlocking clutch brakes of the type referred to as "replaceable". Most however are relatively expensive to manufacture, and require relatively complex apparatus for their manufacture and use. Several of the devices are easily installed, but difficult to remove after installation. One of such "replaceable" devices, for example, requires the use of spot welding for installation of a clutch brake on a clutch shaft but subsequently requires the use of a torch to cut the used clutch brake from the shaft as shown and described in U.S. Pat. No. 4,512,450. A more convenient system would avoid any use of welding, and would preferably require only the use of a single hand-operated tool for both assembly and disassembly.

SUMMARY OF THE INVENTION

The invention disclosed herein provides a clutch brake formed of two interlocking parts adapted to fit together to form a clutch brake. The resultant assembly is easily mounted and removed from a clutch shaft, requiring only a single hand-tool. In a preferred form, the clutch brake incorporates first and second interlocking U-shaped parts which together define a central aperture adapted to engage a clutch shaft. The second part is radially inserted via tongue and groove into the first part to couple the two parts together.

A bowed spring defines a pair of ends which spread apart atop the second interlocking part by application of a radial force sufficient to partially flatten the bowed portion. A pair of aligned bores in the first and second parts receive the ends of the spring, thus securing the two parts together. The bowed portion of the spring includes a non-threaded aperture, and the second part includes a threaded aperture directly under the non-threaded spring aperture. For retaining the bowed portion of the spring in a deflected condition to retain the two parts together, the shaft of a bolt is inserted through the spring aperture and secured within the threaded aperture of the second part. Rotation of the bolt head causes a radially inwardly directed force to deflect the bowed portion. The bolt head also operates to retain the spring in a deflected condition.

DETAILED DESCRIPTION OF A PREFERRED EMBODIMENT

Figure 1:
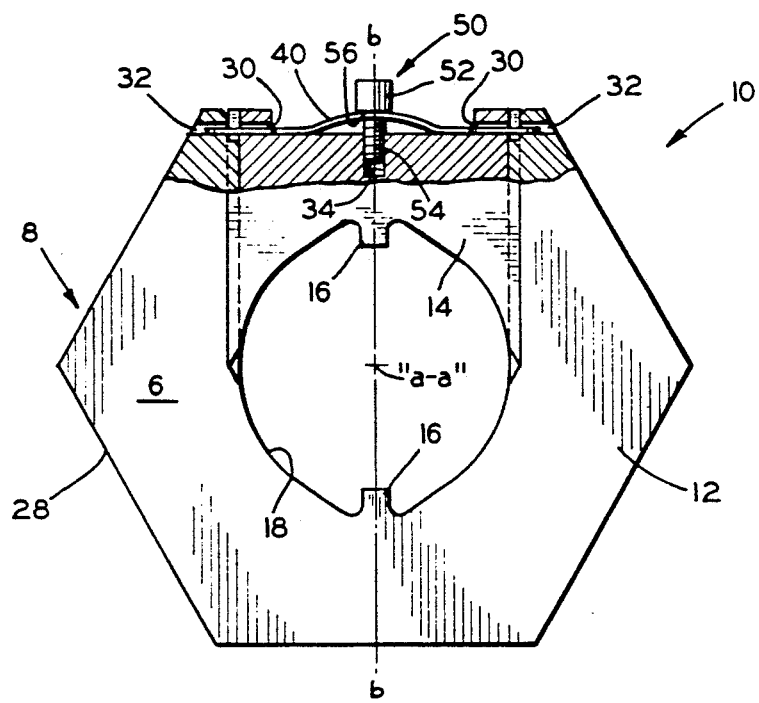
FIG. 1 is a sectional side view of a preferred embodiment of the assemble clutch brake of the present invention.
Figure 4:
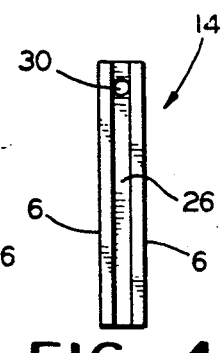
FIG. 4 is an end view of the second part.
Figure 6:
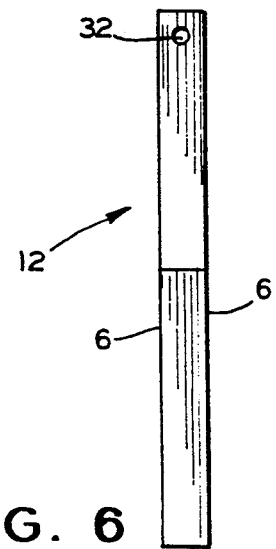
FIG. 6 is an end view of the first part.

Referring initially to FIG. 1, a clutch brake 10 incorporates a first interlocking body portion 12, which hereinafter will be also variously referred to as a larger part or major part. A smaller interlocking body portion 14 is adapted to be radially interlocked with the first part 12, and will hereinafter be also variously described as a minor part or second part. Conventional friction facings (not shown) are secured to opposing planar faces 6 of the parts 12 and 14 (FIGS. 4 and 6).

Each of a pair of tangs 16, one being included in each of the first and second parts 12 and 14, respectively, is adapted to engage a clutch shaft (not shown) for relatively non-rotatable securement of the clutch brake to the rotatable clutch shaft about an axis "a—a" (shown as a point). For this purpose, the shaft will normally have slots (not shown) adapted to receive the tangs.

Figure 5:
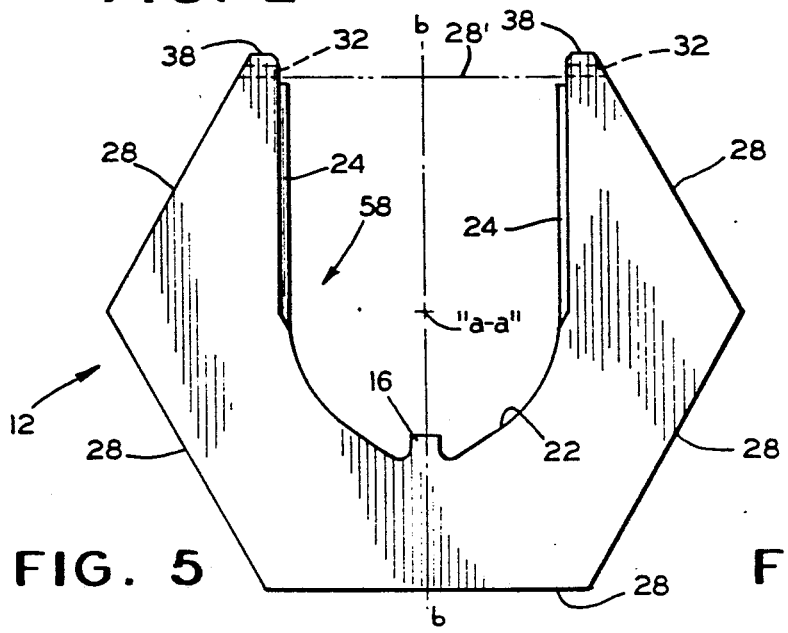
FIG. 5 is a sectional side view of only the first or major part of the clutch brake of FIG. 1.

The clutch brake 10 incorporates a central aperture 18 adapted to circumferentially engage the shaft, the central aperture 18 being comprised of an arcuate shaft-engaging boundary 20 of the minor part 14 (FIG. 2), and an arcuate shaft-engaging boundary 22 of the major part 12 (FIG. 5).

The first and second parts 12 and 14 are radially interlocked together by left and right tongues 24 (FIG. 5) on the first part which engage correspondingly positioned left and right mating grooves 26 (FIG. 2) in the second part 14. An exterior boundary 8 (FIG. 1) of the presently preferred embodiment of the clutch brake 10 comprises a hexagonal shape, thus defining six flat edges 28, as shown. Referring to FIG. 5, it will be appreciated by those skilled in the art that the major part 12 includes an opening 58, equal in width to the diameter of the aperture 18, which passes through what would otherwise be a top edge 28 of the part 12. The missing, or phantom, edge (shown at 28') is supplied by a closure edge 60, also hereinafter called a spring reaction surface, of the minor part 14 upon assembly of the two parts.

Figure 2:
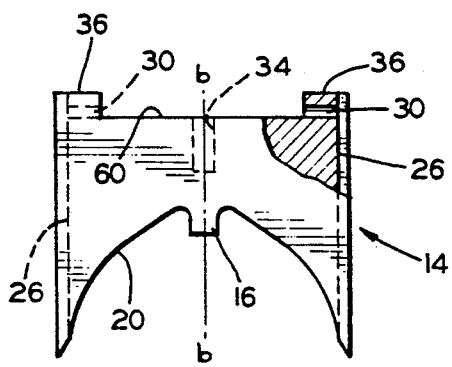
FIG. 2 is a similar view of only the second or minor part of the clutch brake.

Referring now specifically to FIG. 2, the minor part 14 includes a radially aligned central threaded aperture 34 tapped inwardly from the above-noted spring reaction surface 60. The bores 30 are situated in boss segments 36 which extend above and define the ends of the reaction surface 60. The bores are positioned to receive respective extremities 46 of a spring 40 adapted to slide along the surface 60 away from one another in a direction orthogonal to a radial centerline "b—b" of the second part 14. In addition, segmented bosses 38 of the major part 12 (FIG. 5) contain bores 32, which also receive the extremities 46 (after their passage through bores 30) of the spring 40 as the bowed portion 42 is radially inwardly deflected, or partially flattened, toward the spring reaction surface 60.

Figure 3:
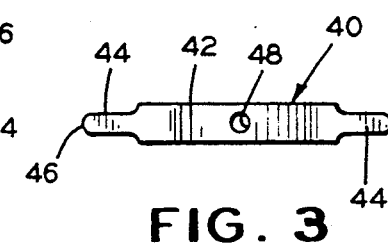
FIG. 3 is a plan view of a spring utilized in the embodiment of FIG. 1.

Referring now to all of the drawing figures, it will be appreciated by those skilled in the art that upon radial insertion of the minor part into the opening 58 of the major part 12, left and right bores 30 of the minor part will become aligned with left and right bores 32 of the major part for the coupling together of the parts by the spring 40. The resultant axial registration of respective bores 30, 32 will therefore permit retention therein of respective left and right spring legs 44 which comprise elongate ends containing the left and right extremities 46 (FIG. 3).

The spring 40 includes an aperture 48 through which a locking member, such as a fastener 50 (FIG. 1), is installed. In the presently preferred embodiment, the fastener has a head 52 fixed to a threaded shaft 54 which engages the threaded central aperture 34. As the head 52 is rotated, for example via socket wrench, the bottom 56 of the head will bear against the bowed portion 42 of the spring 40, urging the right and left spring legs 44 into the aligned bores 30 and 32 as described. In the presently preferred embodiment shown, the mating tongue and groove members are designed with the tongues 24 being integral to the first part 12, the grooves being integral to the second part 14. This invention also contemplates a reverse arrangement wherein the tongues are on the minor part, the grooves on the major part. Alternatively, other mating tongue and groove cross-sections could be incorporated such as U-shaped, V-shaped, etc.

Finally, although the use of two tangs 16 is employed in the presently preferred embodiment, a single tang 16 in either the major or minor parts could also be employed. In addition, although the bowed portion 42 of the spring 40 is shown symmetrically positioned with respect to the radial centerline of the second part 14, the bowed portion, the aperture 34, as well as the fastener 50, could all be off-set either to the right or left of the radial centerline "a—a".

Although only one preferred embodiment has been detailed and described herein, the following claims are envisioned to cover numerous additional embodiments which fall within the spirit and scope thereof.

What is claimed is:

1. In a clutch brake comprising first and second parts adapted to interlock together to form a disc-shaped body, said body comprising a central aperture defining an axis and being adapted to engage a clutch shaft along said axis, said aperture further defining at least one radially inwardly projecting tang adapted to secure said body on said shaft, and separate locking means for securing said first and second parts together; an improvement comprising: (a) said first interlocking part comprising a major portion of said body and defining a first boundary portion of said aperture, said first part comprising an opening having a width substantially equal to that of said central aperture, said opening comprising means for receiving said locking means, (b) said second interlocking part comprising a minor portion of said body and defining a second boundary portion of said aperture, said second part being sized to interlockingly engage said opening in said first part such that said first and second boundary portions mate together to form said central aperture, wherein said second part comprises a closure for said opening of said first part, said second part further comprising a closure edge, and means for receiving said locking means, (c) said separate locking means comprising a spring seated against said closure edge of said second part, said spring having spaced elongate ends and a bowed portion between said ends, said spring ends engage said receiving means of said first and second parts after said parts are interlocked together, whereby when said bowed portion is radially inwardly deflected against said closure edge of said second part, said elongate ends spread apart to engage said receiving means of said first and second parts.

2. The clutch brake of claim 1 further comprising (d) means for deflecting said bowed portion of said spring and for retention of said spring in a deflected condition, and wherein said closure edge of said second part comprises a spring reaction surface.

3. The clutch brake of claim 2 wherein said means for locking comprises (a) an aperture through said bowed portion of said spring, and (b) a bore in said second part positioned under said bowed portion, said bore extending radially inwardly from said closure edge of said second part, (c) a shaft extending from said bore, said shaft defining an operative shaft end extending through said aperture of said bowed portion and radially outwardly of said bowed portion, and (d) rotatable means secured to said operative shaft end, whereby upon rotation of said rotatable means, said rotatable means engages said bowed portion and deflects said bowed portion radially inwardly toward said spring reaction surface, whereby said spaced elongate ends become spread apart from one another to engage said respective means for receiving said locking means.

4. The clutch brake of claim 3 wherein said opening of said first interlocking part defines a radial centerline, wherein said opening comprises a pair of sides each parallel to said centerline, and wherein said means in said opening for receiving said locking means comprises a bore in each side, each bore disposed orthogonally to said centerline.

5. The clutch brake of claim 4 wherein upon installation into said first part, said second part shares said radial centerline of said first part, said second part comprising a pair of bores, each aligned for communication with one of said bores of said first part, said bores of said second part also orthogonally disposed with respect to said radial centerline, wherein each communicating pair of aligned bores of said first and second parts is positioned receive one of said ends of said spring when said spring is radially deflected against said spring reaction surface of said second part.

6. The clutch brake of claim 5 wherein said first and second parts are both U-shaped, and wherein said parts are interlocked together by pairs of radially extending cooperating tongues and grooves.

7. The clutch brake of claim 6 further comprising two radially projecting tangs, one tang on said major part, another tang on said minor part.

8. The clutch brake of claim 4 wherein said rotatable means comprises a bolt head and wherein said shaft comprises a bolt shaft fixed to said head, wherein said shaft is rotatable within said radial bore of said second part via rotation of said head.

9. The clutch brake of claim 4 wherein said rotatable means comprises a nut, wherein said shaft is fixed within said radial bore of said second part.

10. The clutch brake of claim 9 wherein said cooperating tongues and grooves comprise tongues on said major part and grooves on said minor part.

* * * * *